United States Patent Office 2,969,407
Patented Jan. 24, 1961

2,969,407

DESTRUCTION OF ACETYLENES IN A HYDROCARBON MIXTURE CONTAINING ACETYLENES AND BUTADIENE

Mortimer L. Rosenberg, Charles R. Everett, and James B. Hutto, Port Neches, Tex., assignors to Neches Butane Products Company, Port Neches, Tex., a corporation of Delaware No Drawing. Filed Aug. 12, 1959, Ser. No. 833,139

5 Claims. (Cl. 260—681.5)

This invention relates to selective removal of acetylenes from a butadiene-rich hydrocarbon mixture.

Butadiene-1,3 may be manufactured by passing a hydrocarbon stream rich in butylene through a catalytic reactor zone at an elevated temperature, and thereafter separating the butadiene from the resulting mixture. One difficulty in this process is that acetylenes such as ethyl acetylene, vinyl acetylene and methyl acetylene are formed. While acetylenes may be formed in a relatively small percentage, they interfere with subsequent use of the butadiene, and are desirably removed or reduced to a very small percentage.

It is an object of this invention to provide a process for economically removing acetylenes from butadiene-rich hydrocarbon mixtures.

Another object of this invention is to provide a process for economically removing acetylenes from mixtures rich in 1,3-butadiene and/or alpha and/or beta normal butylene.

It has been found that acetylenes can be removed from a butadiene-rich hydrocarbon mixture by passing the mixture over an alkalized iron oxide-chrome oxide catalyst at an elevated temperature. Steam is preferably used as a diluent as it minimizes coking of the catalyst.

The preferred catalyst is available from Shell Development Company, and is described in the patent to Davies, No. 2,461,147. The catalyst preferably has the following formula:

| | Percent by weight |
|---|---|
| $Fe_2O_3$ | 67 |
| $Cr_2O_3$ | 3 |
| KOH | 30 |

Another catalyst which may be used is prepared by mixing about 93 parts of a powdered iron oxide and about five parts of powdered chrome oxide with an aqueous solution of potassium carbonate containing about two parts potassium hydroxide. The resulting mixture is treated at about 930 degrees C. for about three hours. The alkalizing iron oxide-chrome oxide type of catalyst is well known in the art. For a further discussion of these catalysts, see the following patents: Davies et al., 2,461,147; Eggertsen et al., 2,414,585; Gutzeit, 2,408,140.

The catalyst may be used in any suitable vessel, as will be understood by those skilled in the art.

The temperature of the vessel should be maintained within a range between approximately 800 degrees F. and 1060 degrees F. At around 800 degrees F. the percentage of acetylenes destroyed is relatively low, and for commercial operation a higher temperature should be used. It is preferred that the temperature be maintained between 900 degrees F. and 1025 degrees F. At 900 degrees F. a high percentage of acetylene destruction is obtained with a feed containing approximately seventy-five percent butylene and twenty-five percent butadiene. With a feed containing approximately fifty percent butylene and fifty percent butadiene, it is preferred to maintain the temperature at approximately 975 degrees F. as this gives very good acetylene destruction without an adverse change in the other compounds making up the feed.

The preferred temperature ranges given above are based on passing seventy volumes of feed (at 32 degrees F. and 760 millimeters mercury pressure) per volume of catalyst per hour. At greater flow rates, for instance 140 v./v./hr., higher temperatures such as 1025 degrees F. may be used. With 70 v./v./hr. temperatures as high as 1025 degrees F. may be used, but the 975 degrees F. range is preferred as the percentage of destruction of butadiene is slightly less. Above 1025 degrees F. at 70 v./v./hr. 1,3-butadiene destruction increases rapidly, and is excessive beginning at about 1060 degrees F.

With regard to concentration of butadiene in the feed stock, it has been found, as noted above, that different temperatures should be preferably used. In general, higher butadiene content permits the use of higher temperatures without the corresponding destruction of butadiene and butylene which is normally expected with increased temperatures in this range.

Increasing the steam to feed ratio (moles of steam per mole of hydrocarbon feed) tends to increase the destruction of acetylenes and decreases the conversion (net moles of 4 carbon hydrocarbon disappearing divided by moles normal butylene in feed) of butylenes and butadienes at the higher temperatures. For economic operation it appears that a satisfactory destruction of acetylenes can be obtained using a 10/1 steam to feed ratio.

The above discussion is based upon comparative tests in which the temperatures, steam ratio, etc., were varied to determine optimum operating conditions. Examples to follow were taken from these tests. These tests show that while a broad temperature range may be employed that it will vary with variations in the other variables of the process.

A number of runs were made using a feed stock with the following composition:

| Component: | Concentration based on total sample, mol percent |
|---|---|
| Isobutane | 0.0 |
| Isobutylene | 0.2 |
| n-Butane | 0.4 |
| Butylene-1 | 0.8 |
| Trans-butene-2 | 18.3 |
| Cis-butene-2 | 36.7 |
| Butadiene-1,3 | 40.9 |
| Pentane and heavier | 2.7 |
| Total | 100.0 |

Other compounds:

| | | |
|---|---|---|
| Furfural | mol percent | 0.073 |
| Acetylene | do | 1.174 |
| Sulfur | wt. p.p.m. | 469 |

It was found that optimum conditions were as follows:

| | |
|---|---|
| Temperature degrees F. | 950 |
| Steam to feed ratio | 10/1 |
| V./v./hr. | 70 |

Operating data for illustrative runs in the preferred range using feed of composition given immediately above, are given below:

| Runs | 15 | 17 | 18 | 24 |
|---|---|---|---|---|
| Hydrocarbon feed rate, v./v./hr. | 70 | 70 | 70 | 140 |
| Steam ratio | 10 | 10 | 10 | 10 |
| Reactor inlet temp., °F. | 1,023 | 976 | 973 | 1,021 |
| n-Butylene Recovery, mol percent | 100.7 | 101.8 | 101.3 | 102.0 |
| Butadiene-1,3 Recovery, mol percent | 99.0 | 100.2 | 99.5 | 100.0 |
| Acetylene Disappearance, mol percent | 92.2 | 91.1 | 71.1 | 85.0 |
| Carbonyl Yield, mol percent on feed | | 0.004 | 0.004 | |

The following operating data illustrates the limitations on the temperature which may be used:

| Run No. | 2 | 3 | 5 |
|---|---|---|---|
| Hydrocarbon feed rate, v./v./hr | 70 | 70 | 70 |
| Steam ratio | 20/1 | 20/1 | 20/1 |
| Reactor bed inlet temp., °F | 1,102 | 1,058 | 801 |
| Conversion, mol percent | 8.2 | 3.1 | 0.0 |
| Butadiene Recovery, mol percent | 83.4 | 91.9 | 102.0 |
| Acetylene Disappearance, mol percent | 90.0 | 91.0 | 53.8 |
| Carbonyl Yield, mol percent feed | 0.057 | 0.007 | 0.024 |

It will be noted that at about 800 degrees F. the percentage of acetylene destroyed is relatively low, and that around 1058 degrees F., and above, the percentage of butadiene destroyed is excessively high.

Additional runs were made with feed stock having the following analysis:

| Component: | Concentration, mol percent on feed |
|---|---|
| Trans-butylene-2 | 33.9 |
| Cis-butylene-2 | 44.8 |
| Butadiene-1,3 | 20.8 |
| Pentane and heavier | 0.5 |
| Total | 100.0 |
| Sulfur | Nil |
| Furfuraldehyde | Nil |
| Acetylenes | 1.30 |

This feed was used in an extended run and optimum operating conditions were found to be 70 v./v./hr. feed stock, 10/1 steam to feed ratio, and 900 degrees F. temperature. The catalyst was not regenerated for several hundred hours but was heavily coked when removed from the vessel. Over several hundred hours the acetylene destruction varied between eighty and ninety percent. The recovery of normal butylene isomers varied between 90.0 and 101.4%. The butadiene recovery varied between 98.6 and 101.5%.

All of the above runs were over the catalyst described in the Davies patent.

While the reaction which occurs is not understood, it is believed that it is not a hydrogenation reaction as there is no free hydrogen in the feed stream.

From the above examples it will be seen that for substantial acetylene destruction a minimum temperature of about 800 degrees F. is necessary, and as the temperature increases the percentage destruction of acetylene increases. Of course, as temperature increases the percentage destruction of butylene and butadiene increases, and becomes excessively high at around 1060 degrees F. There is a broad range of temperatures which are acceptable. Taking a percentage acetylene destruction of eighty percent as an economic minimum, the feed temperature may be any value above 900 degrees F. However, excessive butadiene destruction occurs over about 1025 degrees F. under some operating conditions. By increasing the volume of feed stock to volume of catalyst per hour, it is possible to maintain the percentage destruction at a reasonable figure under temperatures at around 1025 degrees F. However, as we approach 1060 degrees F. the butadiene destruction becomes excessive. Even high steam to feed ratio does not prevent the excessive loss of butadiene at the very high temperatures.

In the production of butadiene-1,3 from a stream rich in butylene, a nickel-calcium-phosphate catalyst such as described in U.S. Letters Patent 2,442,319 gives excellent efficiency of conversion to butadiene. However, the use of this catalyst in the conventional process of forming butadiene-1,3 in the manner described in the patent may result in the production of acetylenes. Where the process of forming butadiene-1,3 with this catalyst cannot be controlled to limit the production of acetylenes to less than purchasers' specifications, the method of removal of the acetylenes discussed above has been found to give excellent results. In fact, the feed stock used in the several examples given above was prepared over the catalyst described in Patent No. 2,442,319 and it will be noted that the percentage of acetylenes was substantially reduced when the feed was treated in accordance with this invention.

The foregoing disclosure and description of the invention is illustrative and explanatory thereof and various changes in the process may be made within the scope of the appended claims without departing from the spirit of the invention.

What is claimed is:

1. A process for selectively destroying acetylenes in a mixture of hydrocarbons containing butadiene and butylene combined in a major percentage and acetylenes comprising passing said mixture together with steam over an alkalized iron oxide-chrome oxide catalyst at a temperature between 900° and 1025° F.

2. A process for selectively destroying acetylenes in a mixture of hydrocarbons containing acetylenes and a substantial percentage of butadiene comprising passing said mixture together with steam over an alkalized iron oxide-chrome oxide catalyst at a temperature between 900 degrees F. and 1025 degrees F.

3. A process for selectively destroying acetylenes in a mixture of hydrocarbons containing approximately fifty percent butylene and fifty percent butadiene and a small amount of acetylenes comprising passing said mixture together with steam over an alkalized iron oxide-chrome oxide catalyst at a temperature of approximately 975 degrees F.

4. A process for selectively destroying acetylenes in a mixture of hydrocarbons containing approximately seventy-five percent butylene and twenty-five percent butadiene and a small amount of acetylenes comprising passing said mixture together with steam over an alkalized iron oxide-chrome oxide catalyst at a temperature of approximately 900 degrees F.

5. A process of producing a butadiene-1,3 rich stream substantially free from acetylenes comprising, passing a stream rich in butylene over a nickel-calcium-phosphate catalyst to produce a stream rich in butadiene-1,3 with small amounts of acetylene, and then passing the butadiene-1,3 rich stream, together with steam, over an alkalized iron oxide-chrome oxide catalyst at a temperature between 900° F. and 1025° F.

References Cited in the file of this patent

UNITED STATES PATENTS

| 2,442,320 | Britton et al. | May 25, 1948 |
| 2,851,504 | Hogan | Sept. 9, 1958 |
| 2,866,790 | Pitzer | Dec. 30, 1958 |